E. E. HARRIS.
SPRING WHEEL.
APPLICATION FILED MAY 25, 1910.
989,706.
Patented Apr. 18, 1911.
2 SHEETS—SHEET 2.
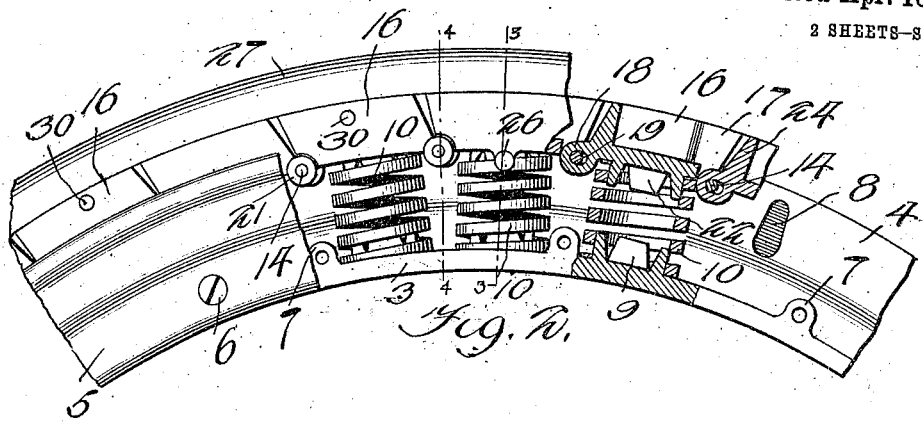
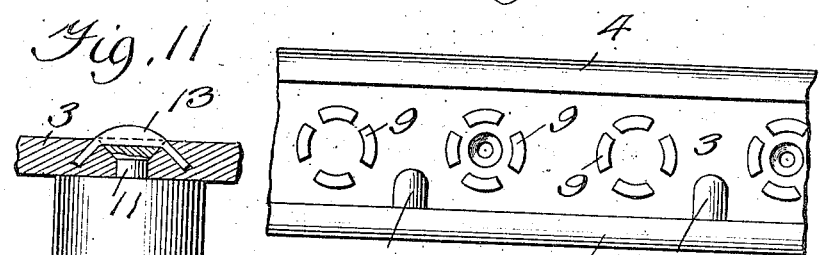
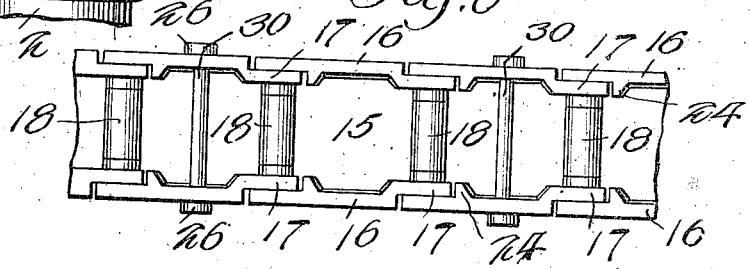
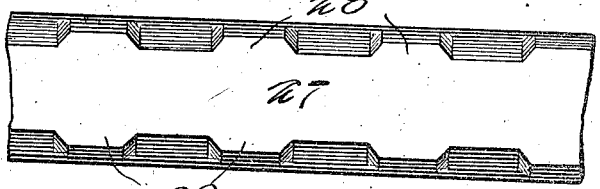
Witnesses
Hugh Hitt.
V. B. Hillyard.
Inventor
Elmer E. Harris
By Victor J. Evans
Attorney

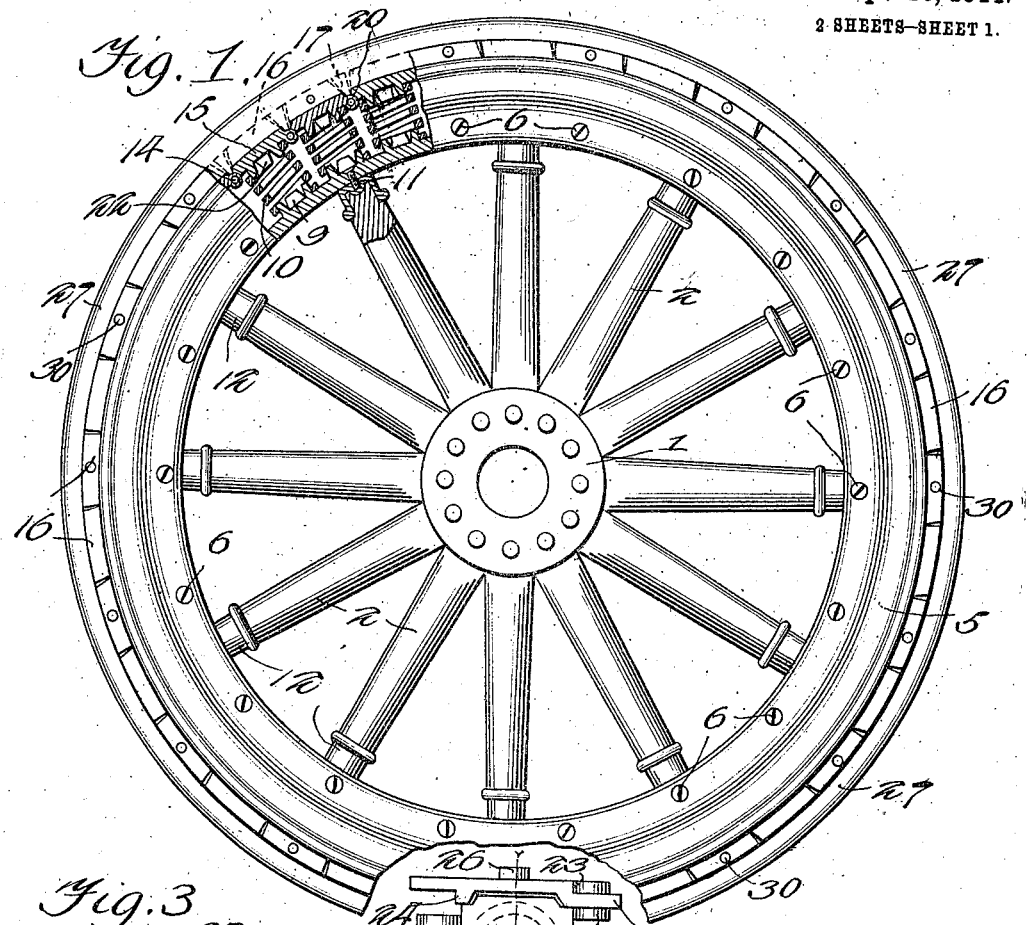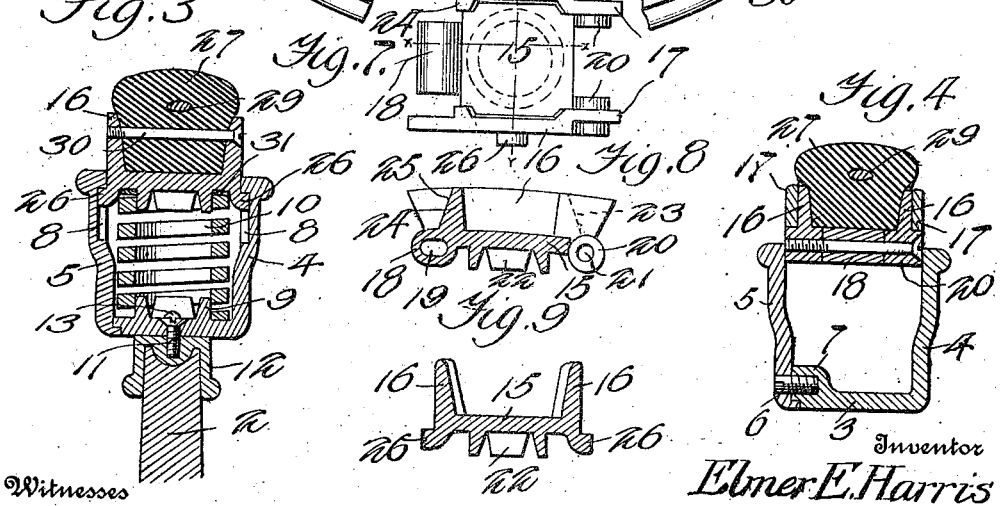

UNITED STATES PATENT OFFICE.

ELMER E. HARRIS, OF MEMPHIS, TENNESSEE.

SPRING-WHEEL.

989,706.

Specification of Letters Patent. Patented Apr. 18, 1911.

Application filed May 25, 1910. Serial No. 563,323.

*To all whom it may concern:*

Be it known that I, ELMER E. HARRIS, a citizen of the United States, residing at Memphis, in the county of Shelby and State of Tennessee, have invented new and useful Improvements in Spring-Wheels, of which the following is a specification.

The present invention provides a vehicle wheel having a yieldable tread of novel form, which is designed to compensate for shock and vibration and add materially to the comfort of the person riding in a vehicle mounted upon wheels embodying the invention, the rim of the wheel being of such formation as to compensate for the direct application of the load which usually flattens the lower part of the wheel in contact with the surface.

The invention contemplates a tire of rubber or like elastic material, a flexible seat for said tire and a plurality of springs supporting said seat and adapted to yield to take up shock and vibration.

The invention consists of the novel features, details of construction and combination of parts, which hereinafter will be more particularly set forth, illustrated in the accompanying drawings, and pointed out in the appended claim.

Referring to the drawings, forming a part of the application, Figure 1 is a side view of a vehicle wheel embodying the invention, parts being broken away. Fig. 2 is a side view of part of the rim on a larger scale, portions being broken away to show more clearly the relative arrangement of the parts. Fig. 3 is a cross section on the line 3—3 of Fig. 2. Fig. 4 is a transverse section on the line 4—4 of Fig. 2. Fig. 5 is a top plan view of part of the casing. Fig. 6 is a top plan view of part of the chain seat for the tire. Fig. 7 is a plan view of a link of the chain seat. Fig. 8 is a longitudinal section on the line $x$—$x$ of Fig. 7. Fig. 9 is a transverse section on the line $y$—$y$ of Fig. 7. Fig. 10 is a detail view of part of the tire as seen from the inner or rim side. Fig. 11 is a detail view, showing more clearly the lock for securing the screw whereby a spoke is made fast to the bottom of the casing.

Corresponding and like parts are referred to in the following description, and indicated in all the views of the drawings; by the same reference characters.

The vehicle wheel comprises a hub 1, spokes 2 and a rim, the latter comprising a casing, a tire, an intermediate chain seat for the tire, and a plurality of springs supporting the chain seat.

The casing in cross section is approximately of U-form and is designed to receive the component parts, such as the springs, the chain seat and the tire. The casing is formed in sections which are separable to admit of placing the parts in position and also to admit of the parts being constructed in an economical and practicable manner. The bottom 3 and one side 4 of the casing are of integral formation, whereas the side 5 is detachable and is retained in place by means of machine screws or fastenings 6, the latter passing through openings formed in the removable side 5 and entering threaded openings formed in bosses 7 provided at intervals in the length of the bottom 3 along the edge to which the side 5 is secured. The outer portion of the casing flares and the sides are provided at intervals in their length with recesses 8 which extend radially and are widened toward their inner ends. Projections 9 are located at intervals in the circumferential length of the casing and are provided upon the outer side thereof and serve to fix the position of the inner ends of the springs 10, which are interposed between the bottom of the casing and the chain seat. The projections 9 are approximately of circular form and are notched to provide openings for the clearance of moisture or other foreign matter that may find its way into the casing and the projections. The casing is secured to the outer ends of the spokes 2 by means of set screws or like fastenings 11, which pass through openings formed in the bottom of the casing and enter threaded openings provided in metal caps 12 fitted to the outer ends of the spokes. To prevent loosening of the screws 11 lock devices 13 are supplied, said lock devices being of flexible material, such as lead and substantially of U-form, the middle portion of the lock device entering the slot formed in the head of the screw and the side members being pressed into oppositely inclined openings formed in the bottom 3 of the casing.

The chain seat is formed of a series of links of like formation which are connected by means of bolts or other fastenings 14.

Each of the links comprises a base portion 15 and longitudinal flanges 16, the latter being offset near one end to throw the end portions 17 inward a distance corresponding to the thickness of the flanges, whereby the end portions of the flanges of adjacent links may overlap, as indicated most clearly in Fig. 6. The ends of the flanges 16 are oppositely inclined. A centrally disposed knuckle 18 is provided at one end of the links and has an elongated opening 19, a pair of knuckles 20 are provided at the opposite end of the link and each of the knuckles has a round opening 21. The knuckles 20 at one end of the links are spaced apart a distance corresponding to the length of the knuckles 18 at the opposite end of the links, so that when the links are assembled the knuckles match and receive the connecting bolts or pins 14. The elongated openings 19 formed in the knuckles admit of the links having a limited play, which is essential when it is remembered that the lowermost portion of a tire flattens when subjected to direct application of the load. Projections 22 are formed upon the inner side of the links and correspond in construction to the projections 9 and are for a like purpose, namely, to fix the position of the springs 10, the outer ends of which fit about the projections 22. The shoulders 23 formed at the outer ends of the offset portions 17 are inclined in an opposite direction to the extremities of the terminal portions 17. Ribs 24 are formed upon the inner sides of the flanges 16 a short distance from the extremities thereof. The outer faces of the ribs 24 form shoulders, which incline in an opposite direction to the shoulders 23. The inclined shoulders 23 and 25 and the inclined ends of the flanges 16 are of such relative proportions that when the lowermost portion of the tire is flattened said inclined parts are slightly spaced, thereby preventing any binding or straining of the parts which would result if the said inclined parts came together before the tire reached the maximum flattening incident to the stress of the load coming thereon. Lugs 26 are formed upon the outer sides of the flanges 16 and enter the recesses 8, thereby preventing any circumferential movement of the chain seat or tire about the rim of the wheel. It is to be understood that the lugs 26 have a limited play incident to the flattening of the lower part of the tire when sustaining the load and provision is had for such play by the widening of the recesses 8 in the manner stated. The elongated openings 19 also admit of the relative play of the links comprising the chain seat. When the links comprising the chain seat are coupled the middle portions of the flanges are spaced apart a greater distance than the end portions, which latter overlap, hence the flanges provide intermediate contracted portions and alternate widened portions, as indicated most clearly in Fig. 6. The contracted portions of the space correspond with the overlapped ends of the flanges 16, whereas the widened spaces correspond to the middle portions of the flanges.

The tire 27 is outwardly flared and is fitted in the space formed between the side flanges of the links comprising the chain seat. Lugs 28 are formed at intervals along the sides of the tire 27 to enter the widened spaces formed at intervals in the length of the chain seat, thereby insuring a close connection between the tire and the chain seat, while at the same time preventing any circumferential movement of the tire in its seat. The tire 27 is preferably solid and is formed of rubber or other elastic material. A binder 29 may pass through the tire and serve to strengthen the same and hold it within the chain seat. Bolts or fastenings 30 pass through the side flanges 16 of certain links and through the tire and assist materially in holding the tire in place.

The springs 10 are of helical form and are interposed between the bottom of the casing and the chain seat and serve to press the latter outward and to sustain the load. The springs are expansible and are retained in fixed position by the projections 9 and 22. Washers 31, of leather or other material, are interposed between the ends of the springs and the casing and chain seat so as to prevent any noise in the event of the springs having any lost motion. The springs are of such tension and construction as to support the load.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In a spring wheel for vehicles, a flexible seat for supporting a resilient tire and forming part of the rim and composed of links, each link embodying a base portion, knuckles at opposite ends of the base portion, side flanges having end portions offset inwardly, and ribs upon the inner sides of the side flanges near the opposite ends thereof, the ends of the side flanges being oppositely inclined and the shoulders formed at the outer edges of the offset portions and the ribs being oppositely inclined to the adjacent inclined ends of the flanges, said links when assembled having the end portions overlapped, and fastenings connecting the links and passing through the knuckles thereof.

In testimony whereof I affix my signature in presence of two witnesses.

ELMER E. HARRIS.

Witnesses:
H. L. DISHEROON,
P. G. HEDGES.